Patented Dec. 12, 1950

2,533,698

UNITED STATES PATENT OFFICE 2,533,698

URETHANES CONTAINING THE LYSERGIC ACID RING SYSTEM AND A PROCESS OF MAKING SAME

Arthur Stoll, Albert Hofmann, and Franz Troxler, Basel, Switzerland, assignors to Sandoz Limited, Basel, Switzerland No Drawing. Application December 16, 1947, Serial No. 792,095. In Switzerland December 18, 1946

8 Claims. (Cl. 260—285.5)

The present invention relates to new urethanes containing the same ring system as lysergic acid and to a process for the manufacture of such urethanes.

It has been found that new urethanes which contain the same ring system as lysergic acid and correspond to the general formula R.NH.COO.R', wherein R denotes the radical $C_{15}H_{15}N_2$ derived from lysergic acid or isolysergic acid $$C_{15}H_{15}N_2COOH$$

and obtainable by removal of the carboxyl group, and R' denotes alkyl, can be prepared by converting lysergic acid or isolysergic acid azides into the corresponding isocyanates and treating the same with an alcohol.

The azides of lysergic acid or isolysergic acid used as starting materials can be prepared by known processes (see A. Stoll and A. Hofmann, Helvetica Chimica Acta 26, 922, 944 (1943); U. S. Patent No. 2,090,429).

The desired esters of carbamic acid can be obtained in very good yields, if the azides are first converted into the isocyanates by heating the former in a suitable solvent, e. g. benzene, and adding to the boiling solution the corresponding alcohol also present in a state of ebullition. It is also possible to prepare the same urethanes by adding the crystallised azide of lysergic acid or isolysergic acid to the boiling alcohol. The isocyanate formed in the hot solvent reacts immediately with the alcohol to form the urethane. In order to obtain good yields it is important that the solvent used is completely free from water.

It is known that in the reactions of lysergic acid or isolysergic acid there is formed an equilibrium mixture of the isomeric forms (see A. Stoll and A. Hofmann, Helvetica Chimica Acta 26, 953 (1943)). Likewise there is obtained a mixture of the two isomeric urethanes both when starting from lysergic acid or isolysergic acid, whereby in the first case 6-methyl-ergolenyl-8- and, in the case of isolysergic acid, 6-methyl-isoergolenyl-8-urethane will predominate.

The separation of the two isomers may be effected according to conventional methods, e. g. by a fractional crystallisation of the bases or of suitable salts, or by means of the chromatographic adsorption analysis.

The new urethanes are relatively stable and form mostly well crystallising compounds which form well crystallised salts which are more or less soluble in water according to the nature of the acid radical. They show the Keller's colour reaction (with glacial acetic acid containing ferric chloride and concentrated sulfuric acid) which is characteristic for the natural ergot alkaloids. They also show the blue fluoresence in ultra-violet light, which fact also is typical for the ergot alkaloids.

It has furthermore been found that in mammalians, the new derivatives exert a manifest central stimulating action. For instance, the respiratory function is strengthened, this stimulating action persisting for a relatively long time and exceeding that of "Lobeline" or other analeptics in duration.

The following examples, without being limitative, illustrate the present invention.

Example 1

Preparation of (6-methyl-ergolenyl-8)-carbamic acid methyl ester.

1.14 parts by weight of d-lysergic acid hydrazide are dissolved in 40 parts by volume of 0.1-n hydrochloric acid, 40 parts by volume of 0.1-n sodium nitrite are added and then 45 parts by volume of 0.1-n hydrochloric acid dropwise added at 0° C. Crystallisation of the hydrochloride of lysergic acid azide begins towards the end of the addition of the acid. After 5 minutes 15 parts by volume of n-sodium bicarbonate are added and the acid azide taken up in 400 parts by volume of benzene.

For the conversion into the isocyanate, the benzene solution is well dried with sodium sulfate and is rapidly heated to boiling and thereupon boiled for 5 minutes. 100 parts by volume of boiling methanol are added in one lot to the boiling solution, and the whole is boiled for 5 minutes to complete the formation of the urethane. After evaporating to dryness in a vacuum 0.9 part by weight of crystallized crude product is obtained as residue.

For purification the urethane is alternately recrystallized from ethanol and chloroform. 0.55 part by weight of pure (6-methyl-ergolenyl-8)-carbamic acid-methyl ester is obtained. Melting point 236–237° C. (decomp.).

The compound dissolves in 80 parts of boiling chloroform from which solution it crystallizes out on cooling in the form of 5-cornered leaflets. From 110 parts of benzene irregular 5 to 6-cornered leaflets are obtained and from methanol or ethanol in which the product is easily soluble longish 4-cornered plates containing solvent of crystallisation are obtained.

$[\alpha]_D^{20°} = +50°$ (pyridine); $+53°$ (chloroform)

Analytical values: $C_{17}H_{19}O_2N_3$:
   Calculated: C 68.65   H 6.44   N 14.14
   Found:    C 68.48   H 6.25   N 14.45
             68.79       6.29      14.49

Keller's colour reaction: like lysergic acid.

Example 2

Preparation of (6 - methyl - isoergolenyl - 8) - carbamic acid methylester.

1.0 part by weight of the hydrazide of d-isolysergic acid is dissolved in 35.5 parts by volume of 0.1-n hydrochloric acid, 3.55 parts by volume of normal sodium nitrite added and 40 parts by volume of 0.1-n normal hydrochloric acid dropwise added at 0° C. After 3 minutes 10 parts by volume of n-sodium bicarbonate are added and the acid azide taken up in 300 parts by volume of benzene. The benzene solution is dried with sodium sulfate and heated rapidly to boiling and boiled for 5 minutes. To the solution cooled to 65° C. there is added in one lot 100 parts by volume of boiling methanol and the solution boiled for a further 3 minutes. It is then evaporated to dryness in a vacuum and the crude product amounting to 0.92 part by weight recrystallized several times from methanol in which it is very soluble in the hot, but only sparingly soluble in the cold and from which long needles united into bundles and containing solvent of crystallisation are obtained. The (6-methyl-isoergolenyl-8)-carbamic acid methylester dissolves in 30 parts of benzene, 10 parts of chloroform or 15 parts of alcohol at the boiling point of the solvent. From the last named solvent there crystallize polyhedra being free from solvent of crystallisation. M. P. 180° C. (decomposition).

$[\alpha]_D^{20°} = +346°$ (pyridine); $+348°$ (chloroform)

Analytical values: $C_{17}H_{19}O_2N_3$:

Calculated: C 68.65 H 6.44 N 14.14
Found: 68.81 6.14 14.59
69.05 6.21

Keller's colour reaction: like lysergic acid.

Example 3

Preparation of (6 - methyl-ergolenyl - 8) - carbamic acid ethyl ester.

1.08 parts by weight of d-lysergic acid-hydrazide are converted into the azide as described in Example 1, and the same is taken up in 300 parts by volume of benzene. The solution of benzene dried with sodium sulfate is quickly heated to boiling and boiled for 5 minutes. 100 parts by volume of boiling ethyl alcohol are added to the boiling solution and the whole boiled for a further 3 minutes and the solution evaporated to dryness in a vacuum.

The dried residue is subjected to chromatographic adsorption analysis on 50 parts by weight of aluminium oxide. The substance is brought onto the column in chloroform and this is developed with benzene. 0.861 part by weight of colorless urethane is obtained by elution in a single zone having a blue fluorescence in ultra-violet light. By recrystallization from benzene there is obtained from it 0.620 part by weight of 6 to 8-cornered leaflets of M. P. 237–238° C. (decomp.).

$[\alpha]_D^{20°} = +48°$ (pyridine); $+51°$ (chloroform)

The (6 - methyl - ergolenyl - 8) - carbamic acid ethyl ester dissolves at boiling temperature in 100 parts of benzene or 30 parts of alcohol.

Analytical values: $C_{18}H_{21}O_2N_3$:

Calculated: C 69.41 H 6.80 N 13.50
Found: 69.45 7.21 13.62
69.64 6.94 13.38

Keller's colour reaction: like lysergic acid.

Example 4

Preparation of (6-methyl-isoergolenyl-8) - carbamic acid ethylester.

0.7 part by weight of d-isolysergic acid hydrazide is dissolved in 25 parts by volume of 0.1-n hydrochloric acid, 5 parts by volume of 0.5-n sodium nitrite are added and 28 parts by volume of 0.1-n hydrochloric acid dropwise added at 0° C. After 5 minutes, 10 parts by volume of n-sodium bicarbonate are added and the acid azide taken up in 500 parts by volume of ether. The ethereal solution is dried with sodium sulfate and carefully evaporated to dryness. The acid azide thus separates for the greater part in the crystallized form.

The powdered azide is added in small portions to 100 parts by volume of boiling alcohol in which it dissolves spontaneously with foaming. After the addition is completed it is boiled for another 3 minutes and then evaporated to dryness. The dry residue is subjected to chromatographic adsorption analysis on 100 parts by weight of aluminium oxide. The substance is brought onto the column in benzene solution, and this is developed with the same solvent. By means of benzene 0.32 part by weight of (6-methyl-isoergolenyl-8)-carbamic acid ethyl ester is obtained in a single zone giving a blue fluorescence in ultra-violet light. This is obtained by recrystallization from benzene in the form of long needle-shaped prisms of M. P. 177° C.

$[\alpha]_D^{20°} = +326°$ (pyridine); $+333°$ (chloroform)

The (6 - methyl - isoergolenyl - 8) - carbamic acid ethyl ester dissolves in 15 parts of benzene or less than 20 parts alcohol at the boiling point of these solvents.

Analytical values: $C_{18}H_{21}O_2N_3$:

Calculated: C 69.41 H 6.80 N 13.50
Found: 69.39 7.16 13.77
69.77 7.24 13.62

Keller's colour reaction: like isolysergic acid.

From the aluminium oxide column there is finally obtained by means of benzene containing 2 per cent of alcohol further 0.15 part by weight of the (6-methyl-ergolenyl-8)-carbamic acid ethyl ester described in Example 3.

Example 5

Preparation of (6-methyl-ergolenyl-8) - and (6-methyl - isoergolenyl-8)-carbamic acid propyl esters.

1.136 parts by weight of d-lysergic acid hydrazide are converted into the acid azide as described in Example 1. This is taken up in 400 parts by volume of benzene. The benzene solution, after thorough drying with sodium sulfate, is rapidly heated to boiling and boiled for 5 minutes. To the boiling solution there is added in one portion 100 parts by volume of boiling propyl alcohol and the solution boiled for further 3 minutes. It is then evaporated to dryness and the dry residue subjected to chromatographic adsorption analysis on 100 parts by weight of aluminium oxide.

By means of chloroform there is first eluted 0.1 part by weight of an oil which does not crystallize from any solvent, the optical rotation of which $[\alpha]_D^{20°}$ lies between $+290°$ and $+300°$. It consists of (6-methyl-isoergolenyl-8)-carbamic acid propyl ester.

By means of chloroform to which ½ per cent of alcohol is added a second zone is eluted which gives 0.3 part by weight of (6-methyl-ergolenyl-8)-carbamic acid propyl ester which crystallises from benzene in large six-cornered plates. M. P. 200-202° C. (decomp.).

$[\alpha]_D^{20°} = +47°$ (pyridine); $+49.5°$ (chloroform)

It dissolves in 50-60 parts of boiling benzene or in 10 parts of boiling alcohol.

Analytical values: $C_{19}H_{23}O_2N_3$:
  Calc.:  C 70.11  H 7.13  N 12.92
  Found:    70.48    7.26    13.33
            70.35    7.30

Keller's colour reaction: like lysergic acid.

*Example 6*

Preparation of (6-methyl-ergolenyl-8)- and (6-methyl-isoergolenyl-8)-carbamic acid butyl esters.

1.136 parts by weight d-isolysergic acid hydrazide are converted into the acid azide as described in Example 2, and this is taken up in 400 parts by volume of toluene. The toluene solution after thorough drying with sodium sulfate is rapidly heated to boiling and boiled for 5 minutes. 100 parts by volume of boiling butyl alcohol are added in one lot to the boiling toluene solution and the solution boiled for a further 3 minutes. It is then evaporated to dryness and the dry residue subjected to chromatographic adsorption analysis on 50 parts by weight of aluminium oxide.

By means of chloroform 0.59 part by weight of a non-crystallising oil is first eluted, the rotation of which lies between $+260°$ and $+280°$ and which consists of (6-methyl-isoergolenyl-8)-carbamic acid butyl ester.

By means of the same solvent a second uniform zone is then washed out which gives 0.27 part by weight of (6-methyl-ergolenyl-8-)-carbamic acid butyl ester, which crystallizes from benzene in small 5-cornered leaflets or from alcohol in large 6-cornered plates which melt at 207-208° C. (decomp.).

$[\alpha]_D^{20°} = +42°$ (pyridine); $+49.5°$ (chloroform)

The compound dissolves in 50 parts of benzene and in 10 parts alcohol, 10 parts acetone or 20 parts chloroform at the boiling point of the solvents.

Analytical values: $C_{20}H_{25}O_2N_3$:
  Calc.:  C 70.75  H 7.43  N 12.39
  Found:    70.85    7.35    12.92
            70.94    7.40    12.81

Keller's colour reaction: as lysergic acid.

What we claim is:

1. The optically active urethanes of the formula R.NHCOOR', wherein R denotes a radical selected from the group consisting of 6-methyl-ergolenyl-8-, of 6-methyl-isoergolenyl-8- and of a mixture of 6-methyl-ergolenyl-8- and 6-methyl-isoergolenyl-8- and R' denotes an alkyl group containing 1 to 4 carbon atoms, which urethanes give the Keller's color reaction and which are therapeutically useful compounds.

2. The (6-methyl-ergolenyl-8)-carbamic acid ethylester of the formula $$C_{15}H_{15}N_2-NH.COOC_2H_5$$

which is a colorless crystalline compound melting with decomposition at 237-238° C., having an optical rotation of $[\alpha]_D^{20°} = +48°$ (pyridine) and $+51°$ (chloroform) and giving the Keller's color reaction.

3. The (6-methyl-isoergolenyl-8)-carbamic acid ethylester of the formula $$C_{15}H_{15}N_2-NH.COOC_2H_5$$

which is a colorless crystalline compound melting at 177° C., having an optical rotation of $[\alpha]_D^{20°} = +326°$ (pyridine) and $+333°$ (chloroform) and giving the Keller's color reaction.

4. The 6-methyl-isoergolenyl-8)-carbamic acid propyl ester of the formula $$C_{15}H_{15}N_2-NHCOOC_3H_7$$

which is a non-crystallizing oil possessing the optical rotation of $[\alpha]_D^{20°} = +290-300°$ and giving the Keller's color reaction.

5. A process for the preparation of a urethane containing the lysergic acid ring system and corresponding to the formula R.NH.COO.R', wherein R denotes a member selected from the group consisting of the 6-methyl-ergolenyl-8- and 6-methyl-isoergolenyl-8-radicals, and R' denotes an alkyl group with 1 to 4 carbon atoms, which comprises boiling an azide selected from the group consisting of lysergic acid azide, isolysergic acid azide and a mixture of lysergic and isolysergic acid azides in an anhydrous non-alcoholic solvent with a boiling low molecular alcohol containing 1 to 4 carbon atoms.

6. A process for the preparation of (6-methyl-ergolenyl-8)-carbamic acid ethyl ester, comprising the steps of heating d-lysergic acid azide to boiling temperature in benzene solution, adding thereto ethyl alcohol and heating to boiling temperature until the intermediately formed isocyanate has been transformed into urethane.

7. A process for the preparation of (6-methyl-isoergolenyl-8)-carbamic acid ethyl ester, comprising the steps of heating d-isolysergic acid azide to boiling temperature in benzene solution, adding thereto ethyl alcohol and heating to boiling temperature until the intermediately formed isocyanate has been transformed into urethane.

8. A process for the preparation of (6-methyl-isoergolenyl-8)-carbamic acid propyl ester, comprising the steps of heating d-lysergic acid azide to boiling temperature in benzene solution, adding thereto propyl alcohol and heating to boiling temperature until the intermediately formed isocyanate has been transformed into urethane, and separating the formed iso-derivative from its isomer by chromatographic adsorption on aluminum oxide followed by elution with a solvent.

ARTHUR STOLL.
ALBERT HOFMANN.
FRANZ TROXLER.

REFERENCES CITED

The following references are of record in the file of this patent:

UNITED STATES PATENTS

| Number | Name | Date |
|---|---|---|
| 2,090,430 | Stoll et al. | Aug. 17, 1937 |
| 2,265,217 | Stoll et al. | Dec. 9, 1941 |

OTHER REFERENCES

Sidgwick: "Organic Chemistry of Nitrogen" (Oxford University Press, 1937), pp. 374-376.

Troxler: Helv. Chim. Acta., vol. 30, pp. 163-167 (Feb. 1947).